W. E. Ball.
Nut Lock.
No. 89,460. Patented Apr. 27, 1869.
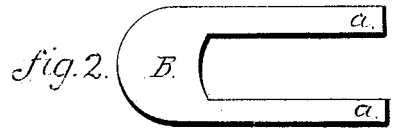
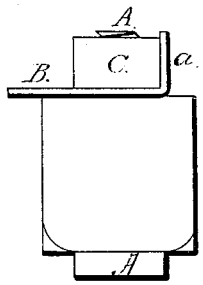
Witnesses:
Cornelius Cox
Leopold Evert
Inventor:
Wm E Ball
per Alexander Mason
Atty

United States Patent Office.

WILLIAM E. BALL, OF BELMONT, OHIO.

Letters Patent No. 89,460, dated April 27, 1869.

IMPROVEMENT IN NUT-LOCK.

The Schedule referred to in these Letters Patent and making part of the same

*To all whom it may concern:*

Be it known that I, WILLIAM E. BALL, of Belmont, in the county of Belmont, and in the State of Ohio, have invented certain new and useful Improvements in Nut-Locks; and do hereby declare that the following is a full, clear, and exact description thereof, reference being had to the accompanying drawings, and to the letters of reference marked thereon.

The nature of my invention consists in so constructing a screw that a washer, placed around the same, cannot be turned, and that by turning up the ends of said washer, the nut, placed on the end of the screw, will become securely locked.

In order to enable others skilled in the art to which my invention appertains, to make and use the same, I will now proceed to describe its construction and operation, referring to the annexed drawings, which form a part of this specification, and in which—

Figure 1 is a side view of the screw;

Figure 2, a plan view of the nut; and

Figure 3, a side view, showing the nut-lock complete.

A represents the screw, which is made in the same manner as any ordinary screw or bolt, except that it is cut square on two sides for a suitable length, as shown in fig. 1.

B represents the washer, made in the peculiar form shown in fig. 2, having two jaws *a a* running parallel with each other, and at a distance equal to the thickness of the screw or bolt A, where the same is cut off square, as above mentioned.

When the bolt A has been inserted where desired to be used, the washer B is placed on the same, the jaws *a a* embracing the square portion of the bolt, and their ends extending on one side.

After the nut C has been placed on the bolt A and tightened, the ends of the jaws *a a* are bent upward, as shown in fig. 3, against the side of the nut.

As the washer B cannot be turned, it will be seen that the nut C cannot work loose nor be removed, unless the jaws *a a* are turned down again.

Having thus fully described my invention,

What I claim as new, and desire to secure by Letters Patent, is—

1. The screw or bolt A, cut square on two sides for a certain distance, substantially as shown and described.

2. The combination of the screw or bolt A, washer B, and nut C, all constructed and arranged to operate substantially as and for the purposes herein set forth.

In testimony that I claim the foregoing, I have hereunto set my hand, this 9th day of March, 1869.

WILLIAM E. BALL.

Witnesses:
LEOPOLD EVERT,
CORNELIUS COX.